United States Patent
Kim et al.

(10) Patent No.: US 7,940,727 B2
(45) Date of Patent: May 10, 2011

(54) METHOD AND APPARATUS FOR CELL RE-SELECTION IN MOBILE TERMINAL

(75) Inventors: Yu-Shin Kim, Osan-si (KR); Hyeong-Su Lee, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 754 days.

(21) Appl. No.: 11/925,582

(22) Filed: Oct. 26, 2007

(65) Prior Publication Data

US 2008/0102847 A1   May 1, 2008

(30) Foreign Application Priority Data

Oct. 27, 2006   (KR) .................. 10-2006-0105322

(51) Int. Cl.
*H04W 4/00* (2009.01)
*H04W 36/00* (2009.01)

(52) U.S. Cl. ....................... 370/332; 455/436
(58) Field of Classification Search .............. None
See application file for complete search history.

(56) References Cited

U.S. PATENT DOCUMENTS

| | | | |
|---|---|---|---|
| 2004/0043769 A1* | 3/2004 | Amerga et al. | 455/437 |
| 2004/0082328 A1* | 4/2004 | Japenga et al. | 455/436 |
| 2004/0109431 A1* | 6/2004 | Abrahamson et al. | 370/342 |
| 2005/0048970 A1* | 3/2005 | Hannu et al. | 455/432.2 |
| 2006/0084443 A1* | 4/2006 | Yeo et al. | 455/449 |
| 2006/0258386 A1* | 11/2006 | Jeong et al. | 455/525 |
| 2007/0004445 A1* | 1/2007 | Dorsey et al. | 455/525 |
| 2007/0287461 A1* | 12/2007 | Ryu et al. | 455/436 |
| 2008/0096566 A1* | 4/2008 | Brunner et al. | 455/437 |

FOREIGN PATENT DOCUMENTS

| | | |
|---|---|---|
| KR | 1020030068726 | 8/2003 |
| KR | 1020040058414 | 7/2004 |
| KR | 1020050036038 | 4/2005 |
| KR | 1020050105024 | 11/2005 |
| WO | WO 99/57933 | 11/1999 |
| WO | WO 2007/086679 | 8/2007 |

OTHER PUBLICATIONS

"Digital Cellular Telecommunicaitons System (Phase 2+); Radio subsystem Link Control (3GPP TS 45.008 version 4.14.0 Release 4) ETSI TS 145 008", Jun. 1, 2004.

* cited by examiner

*Primary Examiner* — Ricky Ngo
*Assistant Examiner* — Clemence Han
(74) *Attorney, Agent, or Firm* — The Farrell Law Firm, P.C.

(57) ABSTRACT

Provided is a method and apparatus for cell re-selection in a dual mode terminal supporting GSM and WCDMA. The method includes measuring a cell re-selection parameter for a WCDMA cell and a GSM cell when attempting a cell re-selection from the GSM cell to the WCDMA cell; determining an additional weight value for cell re-selection; and comparing the determined additional weight value and a cell re-selection threshold value and a weight value received from a network with the cell re-selection parameter.

20 Claims, 3 Drawing Sheets

METHOD AND APPARATUS FOR CELL RE-SELECTION IN MOBILE TERMINAL

PRIORITY

This application claims priority under 35 U.S.C. §119 to an application filed in the Korean Intellectual Property Office on Oct. 27, 2006 and assigned Serial No. 2006-105322, the contents of which are incorporated herein by reference.

BACKGROUND OF THE INVENTION

1. Field of the Invention

The present invention relates generally to a method and apparatus for cell re-selection in a mobile terminal.

2. Description of the Related Art

At present, a Universal Mobile Telecommunications System (UMTS) terminal supporting both GSM and WCDMA at the same time has a higher priority for WCDMA than for GSM. Thus, the terminal performs cell re-selection or handover to WCDMA having a higher priority in an area simultaneously servicing two kinds of Radio Access Technologies (RATs). Handover for the terminal is implemented under the control of a network, but cell re-selection is determined and implemented by the terminal itself in an idle mode without the control of the network. Accordingly, in case where the terminal is located in a service area where there are both WCDMA and GSM cells, the terminal re-selects a WCDMA cell or a GSM cell satisfying a predetermined condition in idle mode.

FIG. 1 is a flowchart illustrating a conventional cell re-selection procedure in a mobile terminal. It is assumed that the terminal is in idle mode.

Referring to FIG. 1, in step 101, the terminal determines if a signal received from a serving WCDMA cell is below a threshold or weakened to an extent of making it difficult to maintain a service. In step 103, the terminal measures a received signal of a target GSM cell located in a service area and determines if a specific condition for re-selecting the target GSM cell is satisfied, when it is determined that the received signal of the serving WCDMA cell is below a threshold. In step 105, the terminal re-selects the target GSM cell and performs handover to the re-selected GSM cell, when the specific condition is satisfied.

In step 107, the terminal determines if a received signal level of the GSM cell is out of a range of a preset level. The preset level has a range of 0 to 7 or 8 to 14. In step 109, the terminal analyzes system information received from a network and identifies a target WCDMA cell located in a service area, when it is determined that the received signal level is out of the preset level range. In step 111, the terminal measures a received signal of the target WCDMA cell and determines if a cell re-selection condition of Table 1 for handover to the target WCDMA cell is satisfied.

Table 1 shows conditions for re-selecting a WCDMA cell in a terminal that is camping on to a GSM cell.

TABLE 1

Conditions for handover from GSM cell to WCDMA cell (3GPP.05.08)

| | |
|---|---|
| Condition 1: | Ec/No >= FDD_Qmin |
| Condition 2: | RSCP >= FDD_Qoffset + RLA_C |
| Condition 3: | RSCP >= FDD_Qoffset + RLA_n |

Referring to Table 1, Ec/No and RSCP denote energy per chip to noise ratio and received signal code power of target WCDMA cell, respectively. RLA_C denotes Received Level Average (RLA) of serving GSM cell. RLA_n denotes RLA of the "n" number of neighbor GSM cells. FDD_Qmin denotes minimum threshold value for Ec/No for frequency division duplex (FDD) cell re-selection. FDD_Qoffset denotes offset between signal strength of GSM and WCDMA cells. FDD_Qoffset is received from the network. The terminal increases FDDQ_offset received from the network by 5 dB and determines if the conditions are satisfied, when attempting to perform handover to the WCDMA cell within 15 seconds after re-selecting a GSM cell.

In step 113, the terminal re-selects the target WCDMA cell and camps on the re-selected WCDMA cell when it is determined that the conditions of Table 1 are satisfied. After that, the terminal terminates the procedure according to the present invention.

As described above, in case where there is a target WCDMA cell in a service area when a terminal camps on to a GSM cell, the terminal measures RLAs of a serving GSM cell and target WCDMA and GSM cells located in the service area every constant period, determines if there is a target WCDMA cell satisfying the conditions of Table 1, and re-selects the target WCDMA cell and camps on the re-selected WCDMA cell when it is determined that there is the target WCDMA cell satisfying the conditions.

However, in case where the re-selected WCDMA cell barely satisfies the conditions of Table 1 and gets increasingly worse, the terminal again re-selects a GSM cell and performs handover to the re-selected GSM cell and again attempts a re-selection from the GSM cell to the WCDMA cell barely satisfying the conditions. As above, when the terminal re-selects the WCDMA cell satisfying the conditions of Table 1, a ping-pong effect can occur in which a cell re-selection is repeated between the GSM and WCDMA cells. Also, this causes a great increase of an amount of an electric current consumed by the terminal.

SUMMARY OF THE INVENTION

An aspect of the present invention is to substantially solve at least the above problems and/or disadvantages and to provide at least the advantages below. Accordingly, an aspect of the present invention is to provide a method and apparatus for cell re-selection in a mobile terminal.

Another aspect of the present invention is to provide a method and apparatus for a cell re-selection from a GSM cell to a WCDMA cell in a dual mode terminal supporting both GSM and WCDMA.

A further aspect of the present invention is to provide a method and apparatus for limiting a cell re-selection from a GSM cell to a WCDMA cell by assigning an additional weight value to a cell re-selection condition in a dual mode terminal supporting both WCDMA and GSM.

A still another aspect of the present invention is to provide a method and apparatus for cell re-selection, for preventing a dual mode terminal supporting both GSM and WCDMA from repeatedly performing cell re-selection.

The above aspects are achieved by providing a method and apparatus for cell re-selection in a mobile terminal.

According to one aspect of the present invention, there is provided a method for cell re-selection in a dual mode terminal supporting Global System for Mobile communication (GSM) and Wideband Code Division Multiple Access (WCDMA). The method includes measuring a cell re-selection parameter for a WCDMA cell and a GSM cell when attempting a cell re-selection from the GSM cell to the WCDMA cell; determining an additional weight value for cell re-selection depending on whether the WCDMA cell has been used before; comparing the determined additional weight value and a cell re-selection threshold value and a weight value received from a network with the cell re-selection parameter; and determining whether the WCDMA cell is re-selected.

According to another aspect of the present invention, there is provided an apparatus for cell re-selection in a dual mode terminal supporting Global System for Mobile communication (GSM) and Wideband Code Division Multiple Access (WCDMA). The apparatus includes a communication module, a weight value setter, and a condition unit. The communication module measures a cell re-selection parameter for a WCDMA cell and a GSM cell when attempting a cell re-selection from the GSM cell to the WCDMA cell. The weight value setter determines if the WCDMA cell has been used before and determines an additional weight value for cell re-selection depending on the determination result. The condition judgment unit compares the determined additional weight value and a cell re-selection threshold value and a weight value received from a network with the cell re-selection parameter, and determines if the WCDMA cell is re-selected.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention provides a method and apparatus for limiting a cell re-selection from a GSM cell to a WCDMA cell by assigning an additional weight value to a cell re-selection condition in a dual mode terminal simultaneously supporting both Wideband Code Division Multiple Access (WCDMA) and Global System for Mobile communication (GSM). The following description is based on the assumption that a mobile terminal is in idle mode.

Figure 1:
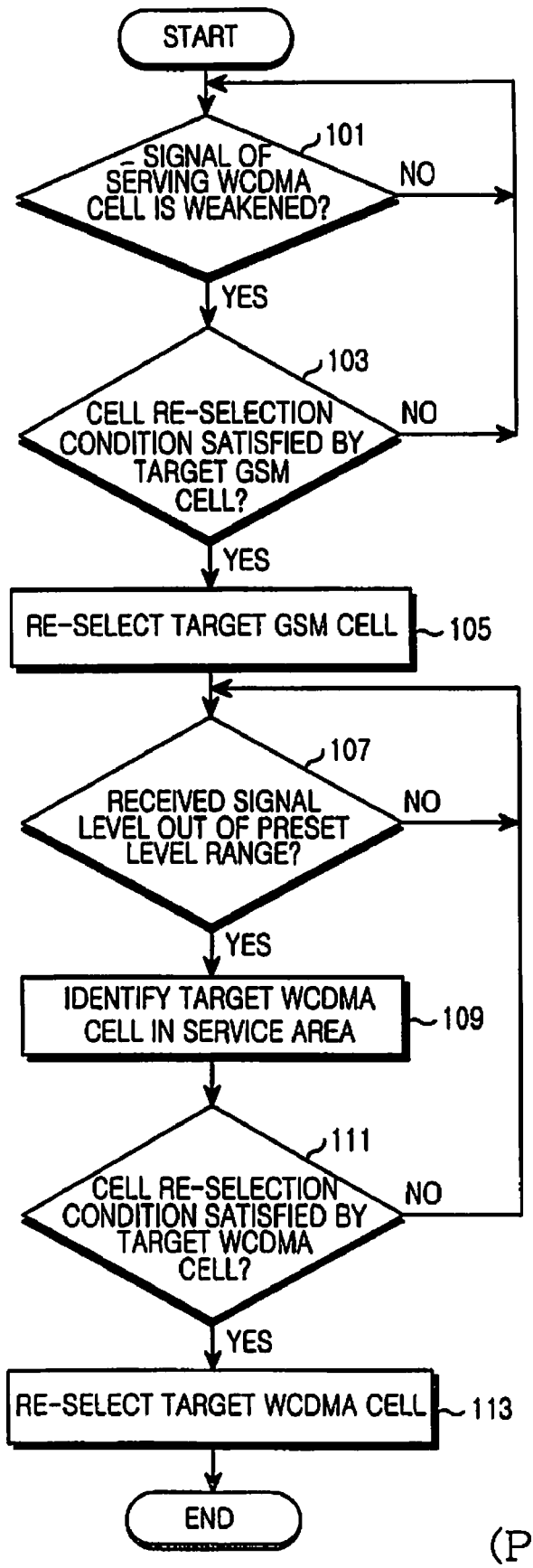
FIG. 1 is a flowchart illustrating a conventional cell re-selection procedure in a mobile terminal.
Figure 2:
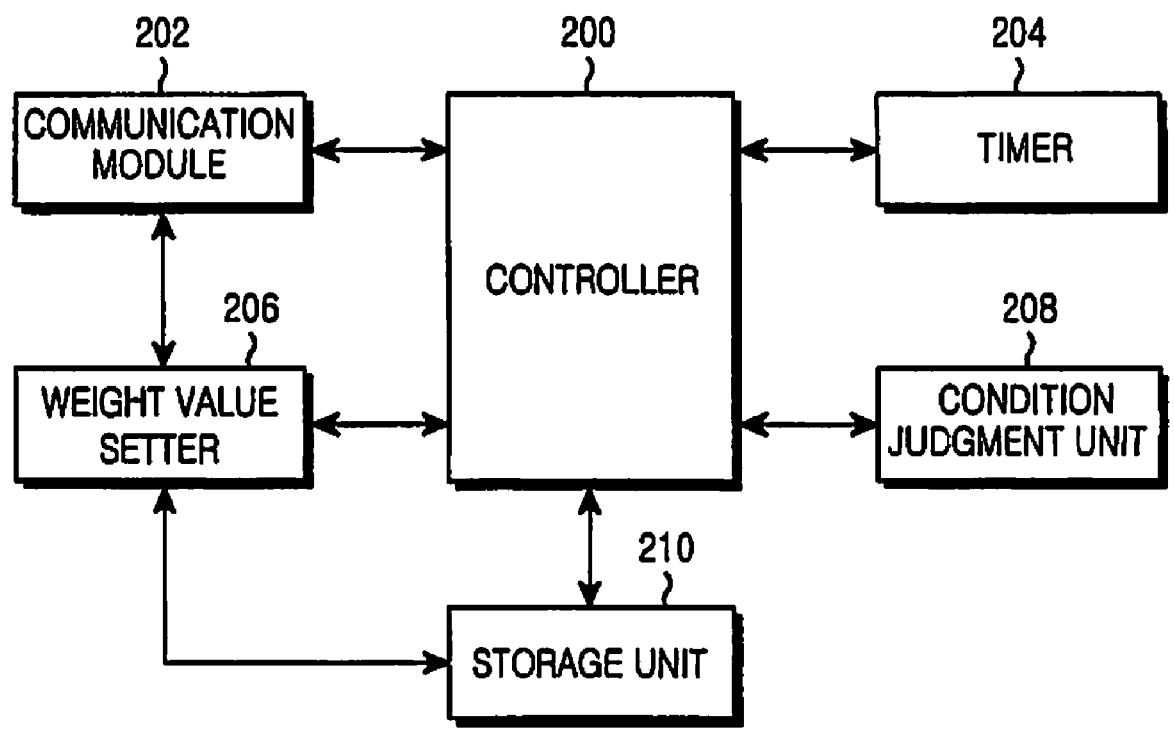
FIG. 2 is a block diagram illustrating a mobile terminal according to the present invention.

FIG. 2 is a block diagram illustrating a mobile terminal according to the present invention. The mobile terminal includes a controller 200, a communication module 202, a timer 204, a weight value setter 206, a condition judgment unit 208, and a storage unit 210.

Referring to FIG. 2, the controller (such as a Micro-Processor Unit (MPU)) 200 performs a process and controls voice communication and data communication. In addition to a general function, the controller 200 processes and controls functions for performing a cell re-selection from a GSM cell to a WCDMA cell according to the present invention.

In detail, when there is a cell re-selection from a serving WCDMA cell to a GSM cell, the controller 200 enables the timer 204, identifies a received signal level of the GSM cell, and determines whether to search a WCDMA cell. If it is determined that the received signal level of the GSM cell is out of a range of a preset level and if it is determined that the WCDMA cell is searched, the controller 200 determines if there is a target WCDMA cell in a service area, using system information received from a network. Upon expiration of the timer 204, the controller 200 sends the weight value setter 206 a notification of the expiration of the timer 204 and deletes from the storage unit 210 stored information on WCDMA cells. Upon receipt of a WCDMA cell re-selection enable signal from the condition judgment unit 208, the controller 200 disables the enabled timer 204, processes a function for camping on a target WCDMA cell, and stores in the storage unit 210 information (e.g., cell identification information) on the re-selected WCDMA cell.

The communication module 202 includes a GSM communication module and a WCDMA communication module. Under the control of the controller 200, the communication module 202 is enabled in a GSM mode or a WCDMA mode and exchanges a signal with the GSM cell or the WCDMA cell. Under the control of the controller 200, the communication module 202 measures parameter values for cell re-selection by received signals of the GSM and WCDMA cells and provides the measured parameter values to the controller 200 or the weight value setter 206. The parameter values represent a Received Signal Strength Indication (RSSI) and a Received Level Average (RLA_C) of the serving GSM cell, a Received Level Average (RLA_n) of neighbor GSM cells, and an Energy per chip to Noise ratio (Ec/No) and a Received Signal Code Power (RSCP) of a target WCDMA cell.

The timer 204 determines if there is an attempt to re-select a WCDMA cell, which has ever been used before, within a predetermined time. The timer 204, for example, can measure a specific time of 15 seconds to 900 seconds.

The weight value setter 206 sets an additional weight value for determining a cell re-selection from the GSM cell to the WCDMA cell, that is, FDD_Qecno and FDD_Qrscp shown in Table 2 below and provides the set weight value to the condition judgment unit 208 according to the present invention. FDD_Qecno can have a value of 0 dBm and 20 dBm and FDD_Qrscp can have a value of 0 dBm and 100 dBm. In other words, the weight value setter 206 compares an RSSI of the serving GSM cell with a threshold value. When the comparison result shows that the RSSI is less than a threshold value, the weight value setter 206 sets FDD_Qecno and FDD_Qrscp to zero. When the comparison result is that the RSSI is greater than or equal to a threshold value, the weight value setter 206 receives information (e.g., cell identification information) on WCDMA cells ever used before from the storage unit 210 and determines if a target WCDMA cell is a cell ever used before. When it is determined that the target WCDMA cell is not a cell ever used before, the weight value setter 206 sets FDD_Qecno and FDD_Qrscp to zero. When it is determined that the target WCDMA cell is a cell ever used before, the weight value setter 206 determines if the timer 204 expires using a signal received from the controller 200. When it is determined that the timer 204 expires, the weight value setter 206 sets FDD_Qecno and FDD_Qrscp to zero. When it is determined that the timer 204 does not expire, the weight value setter 206 sets FDD_Qecno to "J" having a value of 0 dBm to 20 dBm and sets FDD_Qrscp to "K" having a value of 0 dBm to 100 dBm.

The condition judgment unit 208 receives FDD_Qecno and FDD_Qrscp from the weight value setter 206, receives the parameter values for cell re-selection from the communication module 202 via the controller 200, and determines if the target WCDMA cell satisfies the conditions shown in Table 2 below.

Table 2 shows conditions for re-selecting a WCDMA cell in a terminal that is camping on to a GSM cell according to the present invention.

TABLE 2

Conditions for handover from GSM cell
to WCDMA cell in the present invention

Condition 1: Ec/No >= FDD_Qmin + FDD_Qecno
Condition 2: RSCP >= FDD_Qoffset + RLA_C + FDD_Qrscp
Condition 3: RSCP >= FDD_Qoffset + RLA_n Referring to Table 2, Ec/No and RSCP denote energy per chip to noise ratio and received signal code power of target WCDMA cell, respectively. RLA_C denotes Received Level Average (RLA) of serving GSM cell. RLA_n denotes RLA of the "n" number of neighbor GSM cells. FDD_Qmin denotes minimum threshold value for Ec/No for frequency division duplex (FDD) cell re-selection. FDD_Qoffset denotes offset between signal strength of GSM and WCDMA cells. FDD_Qoffset can be received from the network. When not received, FDD_Qoffset is a default value. The terminal increases FDD_Qoffset received from the network by 5 dB and determines if the conditions are satisfied, when attempting to perform handover to the WCDMA cell within 15 seconds after re-selecting a GSM cell. The reason why an additional weight value of FDD_Qrscp is not assigned to the condition 3 is that it is ineffective to do so since WCDMA basically has a higher priority than GSM in a dual mode terminal.

The condition judgment unit 208 sends the controller 200 a notification that it is possible to re-select a target WCDMA cell when the target WCDMA cell satisfies the conditions of Table 2.

The storage unit 210 is comprised of a Read Only Memory (ROM), a Random Access Memory (RAM), and a flash ROM. The storage unit 210 stores a micro code and each variety of reference data of a program for performing a process and a control of the controller 200. The storage unit 210 stores temporary data generated in execution of each variety of programs and each variety of updateable storage data. In particular, according to the present invention, the storage unit 210 stores information (e.g., cell identification information) on re-selected WCDMA cells after the timer 204 starts under the control of the controller 200, and deletes the stored information on the WCDMA cells when the timer 204 expires under the control of the controller 200. The storage unit 210 can store only information on the latest re-selected WCDMA cells of the "n" number by limiting the stored number of WCDMA cells to the "n" number. The "n" denotes an integer of 1 to 5.

Figure 3:
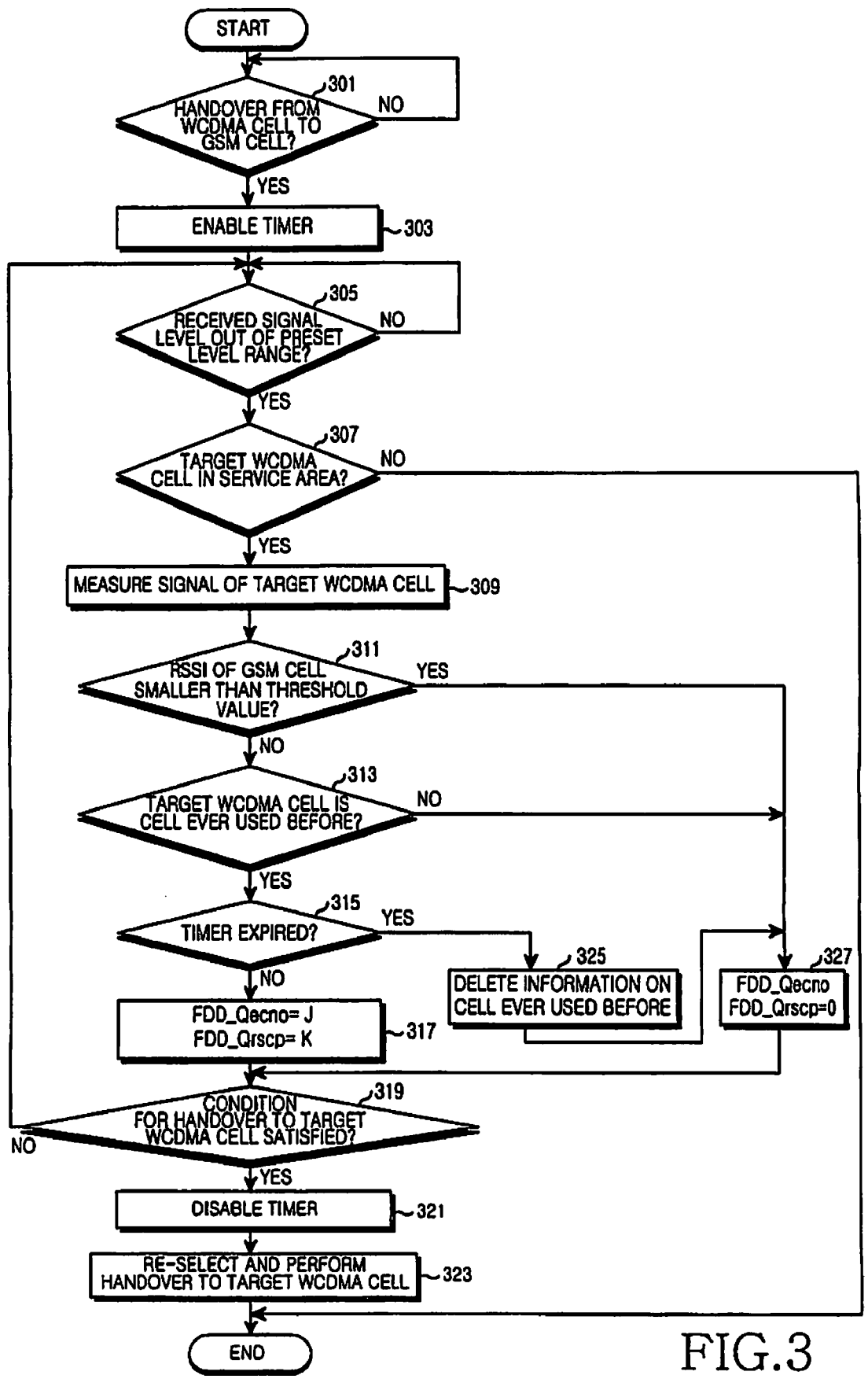
FIG. 3 is a flowchart illustrating a cell re-selection procedure in a mobile terminal according to the present invention.

FIG. 3 is a flowchart illustrating a cell re-selection procedure in the mobile terminal according to the present invention.

Referring to FIG. 3, in step 300, the terminal determines if the terminal itself performs handover from a WCDMA cell to a GSM cell by re-selection in idle mode. In step 303, the terminal enables a timer for measuring a predetermined time at the time of handover from the WCDMA cell to the GSM cell. For example, the timer is a timer for measuring a specific time of 15 seconds to 900 seconds.

In Step 305, the terminal determines if a received signal level of the GSM cell, which is a current serving cell, is out of a range of a preset level. The preset level has a range of 0 to 7 or 8 to 14. In step 307, the terminal analyzes system information received from a network and determines if there is a target WCDMA cell in a service area, when the received signal level of the serving GSM cell is out of the preset level range. The terminal terminates the procedure according to the present invention when it is determined that there is no target WCDMA cell in the service area. In step 309, the terminal measures a received signal of each of target WCDMA cells and measures a parameter for determining cell re-selection, when it is determined that there is a target WCDMA cell in the service area. The parameter represents Ec/No and RSCP of target cell. The terminal can measure values for the cell re-selection, which are RSSI and Received Level Average (RLA_C) of the serving GSM cell and Received Level Average (RLA_n) of neighbor GSM cells.

In step 311, the terminal determines if RSSI of the serving GSM cell is less than a threshold value, comparing RSSI of the serving GSM cell with a threshold value. In step 327, the terminal sets FDD_Qecno and FDD_Qrscp, which are weight values additionally assigned to the conditions for the cell re-selection from the serving GSM cell to the target WCDMA cell, to zero when RSSI of the serving GSM cell is less than a threshold value.

In step 313, the terminal determines if the target WCDMA cell is a cell ever used before by the terminal itself when the RSSI of the serving GSM cell is greater or equal to a threshold value. Whether the target WCDMA cell is a cell ever used before by the terminal itself is determined through comparison between stored information (e.g., cell identification information) on WCDMA cells ever used before and information on the target WCDMA cell. In the step 327, the terminal sets FDD_Qecno and FDD_Qrscp, which are the additional weight values of the cell re-selection condition, to zero when the target WCDMA cell is not a cell ever used before.

In step 315, the terminal determines if the timer enabled in step 303 expires, when the target WCDMA cell is a cell ever used before. In step 325, the terminal deletes stored information on WCDMA cells, which have ever been used before, from the storage unit 210 when the timer expires. In step 327, the terminal sets FDD_Qecno and FDD_Qrscp, which are the additional weight values of the cell re-selection condition, to zero.

In step 317, the terminal sets FDD_Qecno, the additional weight value of the cell re-selection condition, to "J" having a value of 0 dBm to 20 dBm and sets FDD_Qrscp to "K" having a value of 0 dBm to 100 dBm, when it is determined that the timer does not expire and is in operation.

In the step 319, the terminal determines if the target WCDMA cell satisfies the cell re-selection conditions of Table 2, after setting the additional weight value. When it is determined that the target WCDMA cell does not satisfy the cell re-selection conditions, the terminal returns to step 305 and performs its subsequent steps. In step 321, the terminal disables the timer when the target WCDMA cell satisfies the cell re-selection conditions. In step 323, the terminal re-selects the target WCDMA cell and performs handover from the serving GSM cell to the target WCDMA cell. After that, the terminal terminates the process according to the present invention.

Alternate embodiments of the present invention can also comprise computer readable codes on a computer readable medium. The computer readable medium includes any data storage device that can store data that can be read by a computer system. Examples of a computer readable medium include magnetic storage media (such as ROM, floppy disks, and hard disks, among others), optical recording media (such as CD-ROMs or DVDs), and storage mechanisms such as carrier waves (such as transmission through the Internet). The computer readable medium can also be distributed over network coupled computer systems so that the computer readable code is stored and executed in a distributed fashion. Also, functional programs, codes, and code segments for accomplishing the present invention can be construed by programmers of ordinary skill in the art to which the present invention pertains.

As described above, the present invention has an effect that the cell re-selection from the GSM cell to the WCDMA cell can be limited by the additional weight value assigned to the cell re-selection judgment condition, thereby greatly reducing ping-pong occurring between the GSM cell and the WCDMA cell, and the cell re-selection can be limitedly implemented, thereby reducing an amount of an electric current consumed by the cell re-selection in the dual mode terminal supporting both WCDMA and GSM at the same time.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for cell re-selection in a dual mode terminal supporting Global System for Mobile communication (GSM) and Wideband Code Division Multiple Access (WCDMA), the method comprising:
    measuring a plurality of cell re-selection parameters for a WCDMA cell and a plurality of cell re-selection parameters for GSM cells when attempting a cell re-selection from a GSM cell to the WCDMA cell;
    determining a plurality of additional weight values for cell re-selection based on whether the WCDMA cell has previously been used by the terminal;
    comparing one of the plurality of cell re-selection parameters for the WCDMA cell with a sum of one of a plurality of weight values and at least one of one of the plurality of additional weight values and one of the plurality of cell re-selection parameters for the GSM cells, and
    determining whether the WCDMA cell is re-selected in accordance with results of the comparisons.

2. The method of claim 1, wherein determining the plurality of additional weight values comprises:
    determining if the WCDMA cell has previously been used by the terminal;
    determining if the cell re-selection attempt is made within a predetermined time from a time when the terminal camps on the GSM cell, when it is determined that the WCDMA cell is a cell that has been previously used; and
    determining the plurality of additional weight values as preset values when it is determined that the attempt is made within the predetermined time.

3. The method of claim 2, further comprising determining the plurality of additional weight values as zero when it is determined that the attempt is not made within the predetermined time.

4. The method of claim 2, further comprising determining the plurality of additional weight values as zero when it is determined that the WCDMA cell has not been previously used.

5. The method of claim 2, further comprising:
    comparing a Received Signal Strength Indication (RSSI) of the GSM cell with a threshold value; and
    checking whether the WCDMA cell has previously been used by the terminal when the RSSI is greater than or equal to the threshold value.

6. The method of claim 5, further comprising determining the plurality of additional weight values as zero when the RSSI of the GSM cell is less than the threshold value.

7. The method of claim 1, wherein the plurality of cell re-selection parameters of the WCDMA cell comprises an Energy per chip to Noise ratio (Ec/No) and a Received Signal Code Power (RSCP) of the WCDMA cell.

8. The method of claim 7, wherein the plurality of additional weight values comprises a first weight value for comparison with the Ec/No of the WCDMA cell and a second weight value for comparison with the RSCP of the WCDMA cell.

9. The method of claim 1, wherein the plurality of cell re-selection parameters of the GSM cell comprises a Received Level Average (RLA) of a serving GSM cell on which the terminal is camping and an RLA of a neighbor GSM cell.

10. The method of claim 1, further comprising storing information on the re-selected WCDMA cell when it is determined that the WCDMA cell is re-selected.

11. An apparatus for cell re-selection in a dual mode terminal supporting Global System for Mobile communication (GSM) and Wideband Code Division Multiple Access (WCDMA), the apparatus comprising:
    a communication module for measuring a plurality of cell re-selection parameters for a WCDMA cell and a plurality of cell re-selection parameters for GSM cells when attempting a cell re-selection from a GSM cell to the WCDMA cell;
    a weight value setter for determining if the WCDMA cell has previously been used by the terminal and determining a plurality of additional weight values for cell re-selection depending on the determination result; and
    a condition judgment unit for comparing one of the plurality of cell re-selection parameters for the WCDMA cell with a sum of one of a plurality of weight values and at least one of one of the plurality of additional weight values and one of the plurality of cell re-selection parameters for the GSM cells, and determining if the WCDMA cell is re-selected in accordance with results of the comparisons.

12. The apparatus of claim 11, further comprising a storage unit for storing information on the re-selected WCDMA cell when it is determined that the WCDMA cell is re-selected.

13. The apparatus of claim 11, wherein the plurality of cell re-selection parameters of the WCDMA cell comprises an Energy per chip to Noise ratio (Ec/No) and a Received Signal Code Power (RSCP) of the WCDMA cell.

14. The apparatus of claim 13, wherein the plurality of additional weight values value comprises a first weight value for comparison with the Ec/No of the WCDMA cell and a second weight value for comparison with the RSCP of the WCDMA cell.

15. The apparatus of claim 11, wherein the plurality of cell re-selection parameters of the GSM cell comprises a Received Level Average (RLA) of a serving GSM cell on which the terminal is camping and an RLA of a neighbor GSM cell.

16. The apparatus of claim 11, wherein the weight value setter checks whether the cell re-selection attempt is made within a predetermined time from a time point when the terminal camps on the GSM cell, and determines the plurality of additional weight based on whether the cell re-selection attempt is made within the predetermined time.

17. The apparatus of claim 16, wherein the weight value setter compares a Received Signal Strength Indication (RSSI) of the GSM cell with a threshold value and determining if the WCDMA cell is has been previously used based on the comparison of the RSSI and the threshold value.

18. A method for cell re-selection in a portable terminal, the method comprising:
- measuring a plurality of cell re-selection parameters for a first cell and a plurality of cell re-selection parameters for second cells;
- determining a plurality of additional weight values for cell re-selection based on whether the first cell has previously been used by the terminal;
- comparing one of the plurality of cell re-selection parameters for the first cell with a sum of one of a plurality of weight values and at least one of one of the plurality of additional weight values and one of the plurality of a cell re-selection parameters for the second cells; and
- determining whether the second cell is re-selected in accordance with results of the comparisons.

19. A portable terminal for cell re-selection, comprising:
- means for measuring a plurality of cell re-selection parameters for a first cell and a plurality of cell-reselection parameters for cells;
- means for determining a plurality of additional weight values for cell re-selection based on whether the first cell has previously been used by the terminal;
- means for comparing one of the plurality of cell re-selection parameters for the first cell with a sum of one of a plurality of weight values and at least one of one of the plurality of additional weight values and one of the plurality of cell re-selection parameters for the second cells; and
- means for determining whether the second cell is re-selected in accordance with results of the comparisons.

20. A non-transitory computer-readable recording medium having recorded thereon a program for cell re-selection in a portable terminal, comprising:
- a first code segment, for measuring a plurality of cell re-selection parameters for a Wideband Code Division Multiple Access (WCDMA) cell and a plurality of cell re-selection parameters for Global System for Mobile communication (GSM) cells;
- a second code segment, for determining a plurality of additional weight values for cell re-selection based on whether the WCDMA cell has previously been used by the terminal;
- a third code segment, for comparing one of the plurality of cell re-selection parameters for the WCDMA cell with a sum of one of a plurality of weight values and at least one of one of the plurality of additional weight values and one of the plurality of cell-reselection parameters for the GSM cells; and
- a fourth code segment, for determining whether the WCDMA cell is re-selected in accordance with results of the comparisons.

* * * * *